(12) United States Patent
Yang

(10) Patent No.: US 8,107,576 B2
(45) Date of Patent: Jan. 31, 2012

(54) SYNCHRONIZATION METHOD AND RELATED APPARATUS OF AN OFDM DIGITAL COMMUNICATION SYSTEM

(75) Inventor: Li-Ping Yang, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1734 days.

(21) Appl. No.: 11/161,676

(22) Filed: Aug. 11, 2005

(65) Prior Publication Data
US 2006/0034379 A1    Feb. 16, 2006

(30) Foreign Application Priority Data

Aug. 13, 2004  (TW) ................................ 93124484 A

(51) Int. Cl.
*H03D 3/24*         (2006.01)
(52) U.S. Cl. ..................... 375/364; 375/363; 375/360
(58) Field of Classification Search .................. 375/260, 375/343, 364, 341, 332; 370/516, 509, 510
See application file for complete search history.

(56) References Cited

U.S. PATENT DOCUMENTS

| | | | | |
|---|---|---|---|---|
| 5,371,548 A | * | 12/1994 | Williams | 348/478 |
| 6,072,839 A | * | 6/2000 | Mondal et al. | 375/265 |
| 6,172,993 B1 | | 1/2001 | Kim et al. | |
| 6,567,424 B1 | * | 5/2003 | Girardeau, Jr. | 370/509 |
| 6,633,619 B1 | | 10/2003 | Waller et al. | |
| 6,707,866 B1 | * | 3/2004 | Ito | 375/354 |
| 6,950,464 B1 | * | 9/2005 | Shen et al. | 375/240.03 |
| 7,346,131 B2 | * | 3/2008 | Galperin et al. | 375/343 |
| 2005/0117667 A1 | * | 6/2005 | Yajima et al. | 375/324 |

OTHER PUBLICATIONS

"Digital Video Broadcasting (DVB); Framing structure, channel coding and modulation for digital terrestrial television.", ETSI EN 300 744, Jan. 2001, pp. 1-49, vol. 1.4.1.*

* cited by examiner

*Primary Examiner* — Khanh C Tran
*Assistant Examiner* — Qutbuddin Ghulamali
(74) *Attorney, Agent, or Firm* — Thomas, Kayden, Horstemeyer & Risley, LLP

(57) ABSTRACT

A synchronization method and related apparatus of an OFDM digital communication system are disclosed for determining a position of a synchronization byte in a received signal. The method includes extracting a transmission parameter signal (TPS) from the received signal, determining a symbol number and a frame number corresponding to a symbol according to the TPS, and determining the position of the synchronization byte according to the frame number and the symbol number.

11 Claims, 4 Drawing Sheets

| Bit number | |
|---|---|
| S0 | Carried information |
| S1 ~ S16 | Initial bit |
| S17 ~ S22 | Synchronization word |
| S23 ~ S24 | Length indicator |
| S25 ~ S26 | Frame number |
| S27 ~ S29 | Constellation |
| S30 ~ S35 | Hierarchy information |
| S36 ~ S37 | Puncture rate |
| S38 ~ S39 | Guard interval |
| S40 ~ S47 | Transmission mode |
| S48 ~ S53 | Cell indentifier |
| S54 ~ S67 | Reserved for future use |
| | Error protection |

Fig. 1 Prior Art

| | QPSK | 16 QAM | 64 QAM |
|---|---|---|---|
| 2K mode | 3024 bit | 6048 bit | 9072 bit |
| 8K mode | 12096 bit | 24192 bit | 36288 bit |

Fig. 3

SYNCHRONIZATION METHOD AND RELATED APPARATUS OF AN OFDM DIGITAL COMMUNICATION SYSTEM

BACKGROUND OF THE INVENTION

1. Field of the Invention

The invention relates to a communication system, and more particularly, to a synchronization method and related apparatus of a digital communication system.

2. Description of the Prior Art

In a conventional orthogonal frequency division multiplexing (OFDM) communication system, data are modulated with a plurality of sub-carriers, then a transmitter transmits OFDM symbols to a receiver in a series of data packets. As known by those skilled in the art, digital video broadcasting (DVB-T) and digital audio broadcasting (DAB) both correspond to the communication structure of the OFDM communication system. In DVB-T applications, in order to conform to the MPEG2 standard, a packet of 188 bytes first has to be scrambled and Reed-Solomon encoded into a packet of 204 bytes, and then the 204-byte packet is transmitted after being encoded, modulated, and subjected to inverse fast fourier transformation (IFFT). At this time, data in individual MPEG2 packets is scattered. Therefore, the receiving end has to recombine the received data for returning the 204-byte packet to the original 188-byte MPEG2 packet. Additionally, the receiving end has to execute the fast fourier transformation and demodulations, and detect a synchronization byte (SYNC byte) before Reed-Solomon decoding. After the above-mentioned procedure, the 204-byte packet can be Reed-Solomon decoded and returned to the original 188-byte packet form.

Generally, the conventional detection of the SYNC byte utilizes either of the following methods:

Firstly, the method of correlation is disclosed. The SYNC byte appears only once in each 204-bytes packet, and hence the correlation method searches for the SYNC byte in every possible position (204*8 bits).

Secondly, in the DVB-T standard, each OFDM block is regarded as an OFDM symbol, 68 symbols are regarded as a frame, and 4 frames are regarded as a super frame. Therefore, the first byte of each super frame is certainly a SYNC byte and can be identified as such.

The first conventional method requires complex arithmetic or hardware. Additionally, the first conventional method may incorrectly detect the SYNC byte. If the possibility of incorrect detection is to be reduced, data with a plurality of SYNC bytes has to be processed and which results in unnecessary time delays. The second conventional method has to wait for the first byte of the super frame, whose period may be 305 ms with 8k mode and ¼ guard interval. This also causes the worst case of 305 ms potential time delay in the second conventional method.

In addition, the DVB-T standard supports two transmission modes (2K mode and 8K mode), five puncture rates (such as ½, ⅔, ¾, ⅚, and ⅞), three constellations, and two hierarchy modes. Therefore, the transmitter needs to transmits a transmission parameter signal (TPS) to inform the receiver of the transmission mode, the puncture rate, the constellation, and the hierarchy mode so the receiver can operate correctly. In the DVB-T standard, the TPS is transmitted with a frame, where each OFDM symbol has one TPS bit, and a frame has 68 OFDM symbols, so each frame has 68 TPS bits in which to carry complete information. Please refer to FIG. 1. FIG. 1 is a contrast table of the TPS bits and the carried information in the DVB-T standard. As shown in FIG. 1, the TPS utilizes 68 bits ($S_0$-$S_{67}$) to carry required information. As mentioned above, the receiver has to obtain completed TPS information to recover transmitted data correctly. The form of the TPS is known by those skilled in the art and the bit length of completed information is not large. If the information carried in the TPS and the relation between each TPS bit and symbol number can be further utilized to determine the SYNC byte, the disadvantages of the above-mentioned prior art methods can be avoided.

SUMMARY OF THE INVENTION

It is therefore a primary objective of the claimed invention to provide a synchronization method and related apparatus of an OFDM communication system, to solve the above-mentioned problem.

According to a preferred embodiment of the claimed invention, a synchronization method in an orthogonal frequency division multiplexing (OFDM) communication system is disclosed, the method comprises receiving a received signal, extracting a parameter signal from the received signal, extracting a frame number and a symbol number corresponding to a symbol according to the parameter signal, and determining a synchronization byte of the received signal according to the frame number and the symbol number.

Furthermore, a receiver in a communication system is disclosed, the receiver comprises a signal receiving module for extracting a parameter signal from a received signal, a parameter signal processing module coupled to the signal receiving module for extracting a frame number and a symbol number according to the parameter signal, a calculating module coupled to the parameter signal processing module for determining a synchronization byte of the received signal according to the frame number and the symbol number.

In addition, a synchronization method in a communication system is disclosed, the method comprises receiving a symbol, extracting a parameter signal from the symbol, wherein the parameter signal represents a protocol, extracting position information corresponding to the symbol according to the parameter signal, and determining a synchronization byte of the received signal according to the position information and the protocol.

The present invention synchronization method and related apparatus do not have to utilize the prior art correlation arithmetic to a detect SYNC byte. Therefore, the present invention does not need complex hardware, and further reduces the possibility of incorrect detection. Additionally, the present invention synchronization method and related apparatus can, almost synchronously, align the first following SYNC byte of the current symbol without utilizing the initial byte of a super frame to synchronously decode the received signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a contrast table of the TPS bits and the carried information in the DVB-T standard.

FIG. 3 is another contrast table showing relationships between the bit number of an OFDM symbol, transmission modes and constellations.

DETAILED DESCRIPTION

The disclosure takes the DVB-T as an example.

The present invention synchronization method and related apparatus utilize the fact that each TPS bit of each OFDM symbol has a predetermined characteristic in a super frame. For example, as shown in FIG. 1, the above-mentioned contrast table illustrates the TPS, which also conforms to the DVB-T standard. The TPS bit is in a predetermined form, so the symbol number (symbol 0-67) and the frame number (frame 1-4) of the current symbol can be determined through the TPS bit. For example, in the DVB-T standard, the first byte of each super frame must be a SYNC byte lying in symbol 0 of frame 1, and the first byte of each packet must be a SYNC byte, the first byte of every 204 bytes. Therefore, SYNC byte position can be calculated according to the carried information of TPS including the transmission mode, the puncture rate, the constellation, and the hierarchy information, so the receiver can align the next SYNC byte or the following SYNC byte according to the calculated position information.

Figure 2:
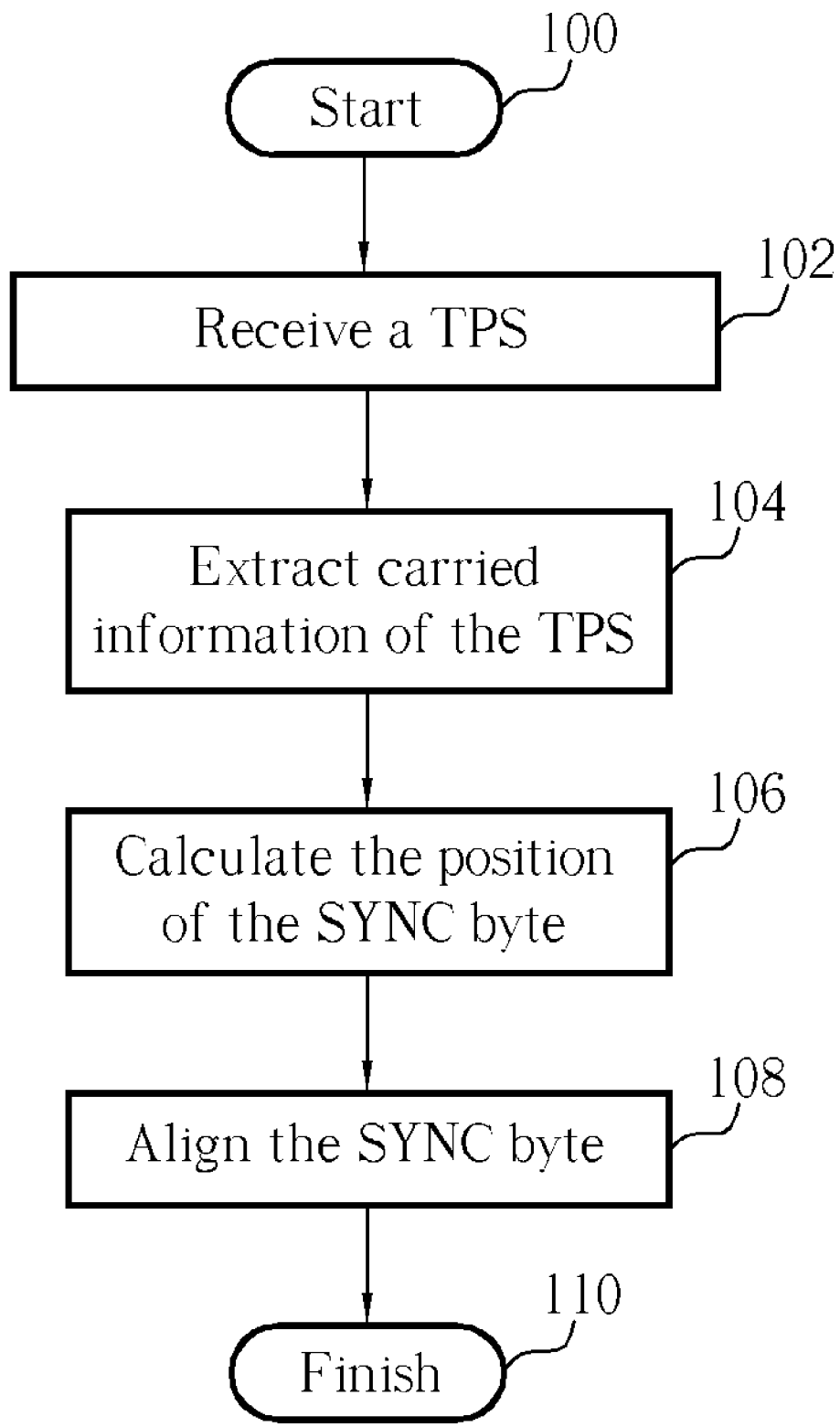
FIG. 2 is a flow chart of an implementation of detecting a SYNC byte according to the present invention.

Please refer to FIG. 2, which is a flow chart of an implementation of detecting a SYNC byte according to the present invention.

Step 100: Start;

Step 102: Extract a parameter signal from a received signal; in the DVB-T standard, the received signal comprises a plurality of symbols, and the parameter signal is the TPS;

Step 104: Extract carried information from the parameter signal; in the DVB-T standard, the transmission mode, the puncture rate, the hierarchy mode, the frame number, and the symbol number, etc. can be obtained from the TPS;

Step 106: Calculate the position of the SYNC byte corresponding to the first bit of the current symbol according to the carried information;

Step 108: Align the SYNC byte according to the position of the SYNC byte corresponding to the first bit of the current symbol; and Step 110: Finish.

First of all, the receiver receives the OFDM signal from the transmitter, and the receiver extracts the TPS from the OFDM signal (step 102), meaning that the receiver reads each TPS bit from a plurality of OFDM symbols of the OFDM signal. Furthermore, the receiver detects a synchronization word of the TPS (as $S_1$-$S_{16}$ shown in FIG. 1) for correctly extracting the carried information of the TPS including the transmission mode, the constellation, the puncture rate, the hierarchy information, and the frame number, and determines the current symbol number according to the current TPS bit (step 104).

An operation embodiment is disclosed for illustrating the operation of step 106. Assume that the hierarchy information corresponds to a non-hierarchical mode. In addition, the relationships between the bit number, transmission modes, and constellations are shown in FIG. 3, which is another contrast table showing bit number of an OFDM symbol with different transmission modes and constellations.

For a specific transmission mode and a specific constellation, the present invention synchronization method obtains a corresponding bit number (Pre_symbol_bit_num) of an OFDM symbol, following which the present invention synchronization method calculates the bit number (Post_symbol_bit_num) after convolutional decoding according to the corresponding puncture rate (puncture-rate) and following equation (1):

$$\text{Post\_symbol\_bit\_num} = \text{Pre\_symbol\_bit\_num} * \text{puncture\_rate} \quad \text{equation (1)}$$

Then, the present invention synchronization method utilizes the following equation (2) to calculate total transmitted bits (Total_bit_num) from the first bit of the current super frame according to the frame number (frame_number) and the symbol number (symbol_number):

$$\text{Total\_bit\_num} = ((\text{frame\_number} - 1) * 68 + \text{symbol\_number}) * \text{Post\_symbol\_bit\_num} \quad \text{equation (2)}$$

As mentioned above, because the SYNC byte lies in the first byte of each packet (204 bytes), the quotient and the remainder of the total bits divided by 1632 (204*8) can be utilized to determine the position of the SYNC byte in the current symbol. For example, if the remainder is 0, the position of the SYNC byte (SYNC byte position=0) is the first byte of the current symbol after the revolution is decoded. Otherwise, the position of the SYNC byte corresponding to the first bit of the current symbol can be calculated through the following equation (3):

$$\text{SYNC byte position} = (\text{floor}(\text{Total\_bit\_num}/1632) + 1) * 1632 - \text{Total\_bit\_num} \quad \text{equation (3)}$$

Here, in equation (3), floor is floor(x), which is a prior art function known by those skilled in the art, and floor(x) is used for obtaining an largest integer less than the inputted parameter x.

Therefore, the receiver can align the SYNC byte according to the calculated position difference between the SYNC byte and the current symbol (step 108) and further return the above-mentioned 204 bytes packet to the 188-bytes packet format. For example, a counter can be utilized to count processed bits, and determine whether the processed bits correspond to the corresponding calculated position of the SYNC byte. If the processed bits do correspond to the corresponding calculated position of the SYNC byte, a signal is inputted into the receiver to inform the receiver, and the following decoding operation can be executed. Please note that according the structure of the receiver, each SYNC byte position corresponding to different transmission modes, constellations, hierarchy information, puncture rates, frame numbers, and symbol numbers can be pre-calculated and stored in a look-up table. Then, the receiver does not need to calculate the position of a SYNC byte when aligning the SYNC byte. In other words, the receiver only needs to refer to the loop-up table to detect the position of the SYNC byte position.

Figure 4:
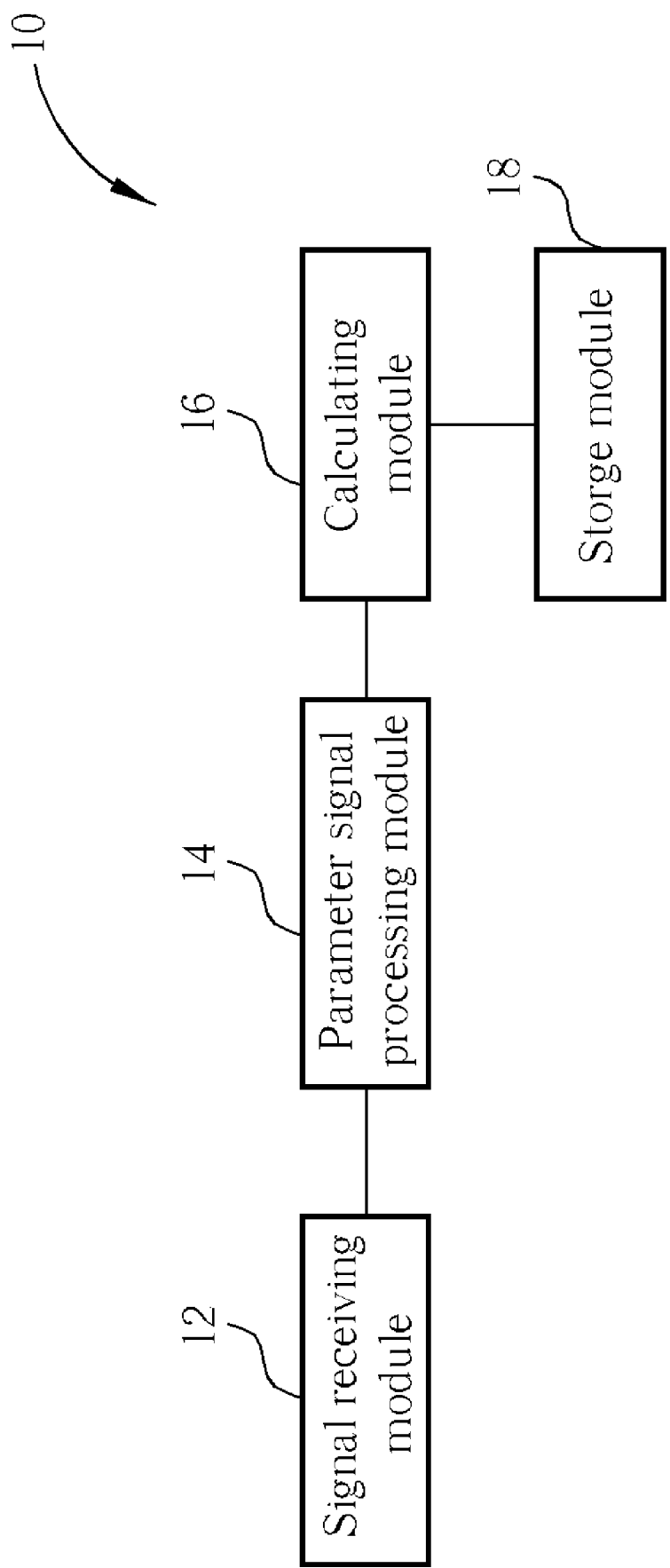
FIG. 4 is a diagram of a receiver 10 according to the present invention.

Please refer to FIG. 4, which is a diagram of a receiver 10 according to the present invention. The receiver 10 comprises a signal receiving module 12, a parameter signal processing module 14, a calculating module, and a storage module 18. If the transmitted signal conforms to the DVB-T standard, the signal receiving module 12 is utilized to receive an OFDM signal including a plurality of OFDM symbols and outputted from a transmitter, and to extract the above-mentioned TPS from the OFDM signal. The parameter signal processing module 14 is used for processing the TPS to extract the transmission mode, the constellation, the puncture rate, the hierarchy information, the frame number, and the symbol number in order to calculate the above-mentioned position relationship between the SYNC byte and the first bit of the current symbol. Additionally, the storage module 18 is used to store the above-mentioned look-up table. Please note that in this embodiment, the position of the SYNC byte can be calculated by the calculating module 16, or can be determined by searching in the look-up table. Furthermore, in the above disclosure, equations (1), (2), and (3) are used for calculating the corresponding position of the next SYNC byte, but equations (1), (2), and (3) can be adjusted to calculate the corresponding position of any other following SYNC byte. The next SYNC byte is only used by way of an example in a preferred embodiment, and should not be regarded as a limitation. As shown in FIG. 4, the storage module 18 is only used for storing the above-mentioned look-up table, therefore, the storage module 18 should also not be regarded as a limitation. In other words, the present invention synchronization method and related apparatus can also be implemented without the storage module 18.

The above-mentioned transmission mode, the constellation, the hierarchy information, and the puncture rate can be obtained through other methods and not solely from the TPS. Furthermore, as mentioned above, the present invention method only has to obtain the carried position information of the TPS bit so that the corresponding frame number and the corresponding symbol number can be determined. It is not necessary to align the synchronization word first.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronization method in an orthogonal frequency division multiplexing (OFDM) communication system, the method comprising:
   receiving a received signal comprising a plurality of symbols, wherein a plurality of synchronization bytes are transmitted via the symbols;
   extracting a parameter signal from the received signal;
   detecting a synchronization word in the parameter signal;
   extracting a transmission mode, a constellation, a puncture rate, hierarchy information, a frame number, and a symbol number corresponding to one of the symbols according to the parameter signal and the synchronization word; and
   utilizing a calculating module to calculate a position of a later one of the synchronization bytes of the received signal according to the transmission mode, the constellation, the puncture rate, hierarchy information, the frame number, and the symbol number.

2. The method of claim 1, wherein the received signal conforms to a digital video broadcasting (DVB-T) standard.

3. The method of claim 1, wherein the parameter signal is a transmission parameter signal (TPS).

4. The method of claim 1, further comprising:
   aligning the synchronization bytes of the received signal according to the position of the later one of the synchronization bytes.

5. A receiver in a communication system comprising:
   a signal receiving module for extracting a parameter signal from a received signal, comprising a plurality of symbols, wherein a plurality of synchronization bytes are transmitted via the symbols;
   a parameter signal processing module coupled to the signal receiving module for detecting a synchronization word of the parameter signal and extracting a transmission mode, a constellation, a puncture rate, hierarchy information, a frame number, and a symbol number according to the parameter signal and the synchronization word;
   a calculating module coupled to the parameter signal processing module for determining positioning of a later one of the synchronization bytes of the received signal according to the transmission mode, the constellation, the puncture rate, the hierarchy information, the frame number and the symbol number.

6. The receiver of claim 5, wherein the received signal conforms to a digital video broadcasting (DVB-T) standard, and the parameter signal is a parameter transmission signal (TPS).

7. The receiver of claim 5, wherein the communication system is an OFDM communication system.

8. The receiver of claim 5, wherein the receiver aligns the synchronization bytes of the received signal according to the position of the later one of the synchronization bytes.

9. A synchronization method of a receiver in an orthogonal frequency division multiplexing (OFDM) communication system, the method comprising:
   receiving a received signal comprising a plurality of symbols, wherein a plurality of synchronization bytes are transmitted via the symbols;
   extracting a parameter signal from the received signal;
   detecting a synchronization word in the parameter signal;
   extracting a transmission mode, a constellation, a puncture rate, hierarchy information, a frame number, and a symbol number corresponding to one of the symbols according to the parameter signal and the synchronization word; and
   utilizing a calculating module to obtain a position of a later one of the synchronization bytes by looking up a table according to the transmission mode, the constellation, the puncture rate, the hierarchy information, the frame number and the symbol number.

10. The method of claim 9, further comprising:
    aligning the synchronization bytes of the received signal according to the position of the later one of the synchronization bytes.

11. A receiver in a communication system comprising:
    a signal receive module for extracting a parameter signal from a received signal comprising a plurality of symbols, wherein a plurality of synchronization bytes are transmitted via the symbols;
    a parameter signal processing module coupled to the signal receiving module for detecting a synchronization word of the parameter signal and extracting a transmission mode, a constellation, a puncture rate, hierarchy information, a frame number, and a symbol number according to the parameter signal and the synchronization word;
    a calculating module coupled to the parameter signal processing module for determining positioning of a later one of the synchronization bytes of the received signal according to the transmission mode, the constellation, the puncture rate, the hierarchy information, the frame number and the symbol number; and
    a storage module for storing a look-up table;
    wherein the transmission mode, the constellation, the puncture rate, the hierarchy information, the frame number, the symbol number, and the position of the later one of the synchronization bytes are all stored in the look-up table, and the calculating module loads the position of the later one of the synchronization bytes from the look-up table according to the transmission mode, the constellation, the puncture rate, the hierarchy information, the frame number, and the symbol number.

* * * * *